UNITED STATES PATENT OFFICE.

HYACINTHE ROUSSAN AND MARIE G. DE BARBEYRAC, OF PARIS, FRANCE.

RECTIFYING ALCOHOL AND OTHER CRUDE SPIRITS.

SPECIFICATION forming part of Letters Patent No. 272,585, dated February 20, 1883.

Application filed April 17, 1882. (No specimens.) Patented in Belgium January 20, 1882, in France January 27, 1882 and in Germany January 27, 1882.

*To all whom it may concern:*

Be it known that we, HYACINTHE ROUSSAN and MARIE GASTON DE BARBEYRAC, both of Paris, in the French Republic, have invented a certain new and useful Improvement in Rectifying Alcohol and other Crude Spirits, of which the following specification is a full description.

The present invention consists in treating alcohols, phlegms, and other spirits by treatment with chloride of lime (bleaching-salt) after the liquor has been rendered alkaline by lime or other alkali. Attempts have often been made to purify alcohols with chlorine, chlorides, and particularly with a mixture of chloride of calcium and hypochlorite of lime, known in commerce as "chloride of lime;" but in these attempts the object has been to produce chlorine, in order that it may act upon the organic matters present in the spirits. The crude alcohols (the phlegms) being acid, a rapid disengagement of the chlorine has been the natural result of the addition of the chloride of lime, and in some cases the disengagement has been rendered more active by the addition of acid. The results of these processes have not been satisfactory, and at this day the authorities unite in condemning the use of chlorine and chlorides. As a matter of fact, if chlorine destroys certain products, *per contra* it determines the formation of other chlorinated products.

In proceeding according to the present invention, the liquor being previously rendered alkaline, the disengagement of the chlorine heretofore sought is rendered impossible. The alkali makes stable the hypochlorite, and if from any cause the stability is destroyed it absorbs the chlorine. The saturation with alkali thus made preparatory to addition of the chloride of lime effectually prevents the formation of all odor of chlorine. The reaction which actually takes place in this case, although known to science, differs entirely from what has heretofore been sought, and has never to my knowledge received the industrial application now made by me.

It is known that in an alkaline solution hypochlorite of lime in the presence of some drops of chloride of cobalt decomposes into oxygen and chloride of calcium, the chloride of cobalt acting by catalysis. The same effect can be produced by other bodies, just as a number of substances will determine the decomposition of oxygenated water.

In the present invention the chloride of lime cannot produce chlorine. It can only produce oxygen. It is thus by oxygen set free by catalytic action from the hypochlorite in the chloride of lime that the purification of the alcohols is effected in my improved process, which bears a resemblance, therefore, to the common method of blowing air through the alcohol—a method which I apply to liquors infected with odors of chlorine, the air being pure or purified by filtration. The quantity of chloride of lime which is added after alkalization depends upon the degree of impurity or of bad taste in the liquor. It is determined by special tests made with a graduated burette. By treating a sample of the liquor as before indicated, adding the chloride of lime little by little until the desired purification is effected, and comparing the quantity of the sample with that of the main body of the liquor to be treated, and proportionately increasing the amount of chloride of lime, the requisite quantity of that material will be obtained. In rendering the liquid alkaline the lime may be added until the natural acidity of the liquor is corrected and it becomes definitely alkaline to test papers. A slight excess of lime will not be disadvantageous, the lime being sparingly soluble and being readily separable. In treating with the chloride of lime the liquor is to be tested after each addition thereof. The taste, odor, and other tests familiar to those skilled in the art will indicate when the desired degree of purification is effected. It is obvious that the purification may be carried on to any desired extent less than perfect purification. The oxygen generated in small quantities from the decomposition of the chloride of lime placed in alkaline liquor does not act directly upon the natural alcohol of any series; but it acts directly and at ordinary temperatures upon the aldehydes, which it oxidizes with disengagement of heat. It is these aldehydes which render distillation difficult, since, as has been shown, their points of ebullition are partly above or below and partly intermediate between the boiling-points of the alcohols, and they are themselves decomposed in the process. By destroying the aldehydes and at the same time certain more complex bodies, partly nitrogenous, the chloride of lime allows the natural alcohols to be obtained with definitely-graduated boiling-points—that is to say, alcohols whose boiling-points are well defined and differ from one another by degrees, so as to admit of practical distillation.

The improved process, besides producing an excellent quality of alcohol, gives an increased yield and a corresponding diminution in the waste or by-products, for the oxygen (being disengaged in presence of the fatty fermentable matters in the phlegm and a disengagement of electricity due to the fermentation taking place) passes into the state of ozone and acts upon the glycerine, giving rise to a secondary fermentation. The alcohol from this fermentation is added to the rest and increases the yield.

Having now fully described the said invention and the manner of carrying the same into effect, what we claim is—

In the purification of phlegms or impure alcohols, the method of treating the same by rendering the phlegm or impure alcohol alkaline, as by addition of lime, and then, after alkalization, subjecting it to the action of a compound such as chloride of lime, substantially as described.

HYACINTHE ROUSSAN.
MARIE GASTON DE BARBEYRAC.

Witnesses:
E. BEDE,
ADOLPH S. STEIN.